United States Patent
Kappelman et al.

(10) Patent No.: US 9,751,377 B2
(45) Date of Patent: Sep. 5, 2017

(54) MULTI-UNIT COOLING SYSTEM WITH DYNAMIC BAFFLE

(71) Applicant: Deere & Company, Moline, IL (US)

(72) Inventors: Joshua J Kappelman, Cedar Falls, IA (US); Adam J Shuttleworth, Jesup, IA (US)

(73) Assignee: DEERE & COMPANY, Moline, IL (US)

( * ) Notice: Subject to any disclaimer, the term of this patent is extended or adjusted under 35 U.S.C. 154(b) by 563 days.

(21) Appl. No.: 13/967,989

(22) Filed: Aug. 15, 2013

(65) Prior Publication Data
US 2015/0047811 A1  Feb. 19, 2015

(51) Int. Cl.
| | | |
|---|---|---|
| *B60H 1/00* | (2006.01) | |
| *B60K 11/04* | (2006.01) | |
| *B60K 11/08* | (2006.01) | |
| *F01P 7/10* | (2006.01) | |
| *F01P 3/18* | (2006.01) | |

(52) U.S. Cl.
CPC .......... *B60H 1/00021* (2013.01); *B60K 11/04* (2013.01); *B60K 11/085* (2013.01); *F01P 7/10* (2013.01); *B60H 2001/00092* (2013.01); *B60K 11/08* (2013.01); *B60Y 2200/221* (2013.01); *B60Y 2200/41* (2013.01); *F01P 2003/182* (2013.01)

(58) Field of Classification Search
CPC ....... B60K 11/04; B60K 11/08; B60K 11/085; B60H 1/00021; B60H 1/2001; B60H 1/00092; B60H 2001/00092; F01P 7/10; F01P 2003/182

USPC .......................................................... 165/96
See application file for complete search history.

(56) References Cited

U.S. PATENT DOCUMENTS

| | | | | |
|---|---|---|---|---|
| 4,546,617 A | * | 10/1985 | Suzuki | ............... B60H 1/00028 165/43 |
| 6,766,774 B1 | | 7/2004 | Kussmann | |
| 7,128,178 B1 | * | 10/2006 | Heinle | .................. B60K 11/04 165/41 |
| 7,784,576 B2 | | 8/2010 | Guilfoyle et al. | |

(Continued)

FOREIGN PATENT DOCUMENTS

| | | | |
|---|---|---|---|
| DE | 102004034313 A1 | 2/2006 | |
| DE | 102006062116 * | 6/2007 | ................ F01P 3/18 |

(Continued)

OTHER PUBLICATIONS english translation DE102006062116 from Espace.*
German Search Report issued in counterpart application No. 14178755.6 dated Jul. 27, 2015 (7 pages).

*Primary Examiner* — Dominick L Plakkoottam
*Assistant Examiner* — Joel Attey
(74) *Attorney, Agent, or Firm* — Taft Stettinius & Hollister LLP; Stephen F. Rost

(57) ABSTRACT

A cooling system for a work vehicle includes first heat exchanger, a fan spaced apart from the first heat exchanger, a second heat exchanger extending between the fan and the first heat exchanger, and a third heat exchanger spaced apart from the second heat exchanger and extending between the fan and the first heat exchanger, A baffle plate is pivotally to a first position reducing air flow through the first heat exchanger and to a second position reducing air flow through the second heat exchanger. The baffle plate is pivoted by a linear actuator.

16 Claims, 3 Drawing Sheets

(56) References Cited

U.S. PATENT DOCUMENTS

| | | | |
|---|---|---|---|
| 8,281,754 B2 | 10/2012 | Saida et al. | |
| 2007/0007061 A1* | 1/2007 | Meyer | B60K 11/04 180/68.1 |
| 2009/0050385 A1* | 2/2009 | Guilfoyle | B60K 11/04 180/68.1 |
| 2010/0000713 A1* | 1/2010 | Takahashi | B60H 1/00899 165/61 |
| 2012/0267082 A1* | 10/2012 | Ringer | F16J 12/00 165/121 |

FOREIGN PATENT DOCUMENTS

| | | |
|---|---|---|
| EP | 1741894 | 1/2007 |
| JP | H10280959 | 10/1998 |
| JP | 2002356115 A | 12/2002 |
| WO | 2011075009 | 6/2011 |

\* cited by examiner

MULTI-UNIT COOLING SYSTEM WITH DYNAMIC BAFFLE

FIELD

The present disclosure relates to a vehicle cooling system with a pivoting baffle.

BACKGROUND

It is known to provide work vehicles, such as agricultural tractors, with a cooling system wherein a plurality of coolers or heat exchangers are positioned on different sides of a volume adjacent to a fan. In such a multi-faced cooling system, it is difficult to properly balance the air flow through all the coolers. Some of the coolers may have too much air flow, while other coolers in the system may have too little air flow. Any excess airflow through a cooler results in wasted power consumed by the cooling fan that could otherwise be used for productive work of the vehicle. In addition, different vehicle operations may benefit from varying the air flows in such a cooling system.

SUMMARY

According to an aspect of the present disclosure, a cooling system is provided for a work vehicle. The cooling system includes first heat exchanger, a fan spaced apart from the first heat exchanger, a second heat exchanger extending between the fan and the first heat exchanger and a third heat exchanger spaced apart from the second heat exchanger and extending between the fan and the first heat exchanger. A baffle plate is pivotally mounted in the cooling system. The baffle plate is pivotal to a first position reducing air flow through the first heat exchanger and to a second position reducing air flow through the second heat exchanger. An actuator pivots the baffle plate.

As a result, the baffle can minimize fan power through the cooling system by directing air flow to the cooler or coolers that need it. The baffle is movable so that it can be used to stategically direct air flow. Because the baffle sits between the two air flow streams, the losses that would occur by simply closing off portions of a cooler are minimized. Also, because the entire cooler is still getting some airflow, the heat load is still more balanced than if airflow was shutoff to a portion of the cooler. If airflow is shutoff to a portion of the cooler, the cooler ends up with a large thermal gradient across the cooler, which generally decreases the cooler life.

DETAILED DESCRIPTION OF THE DRAWINGS

Figure 1:
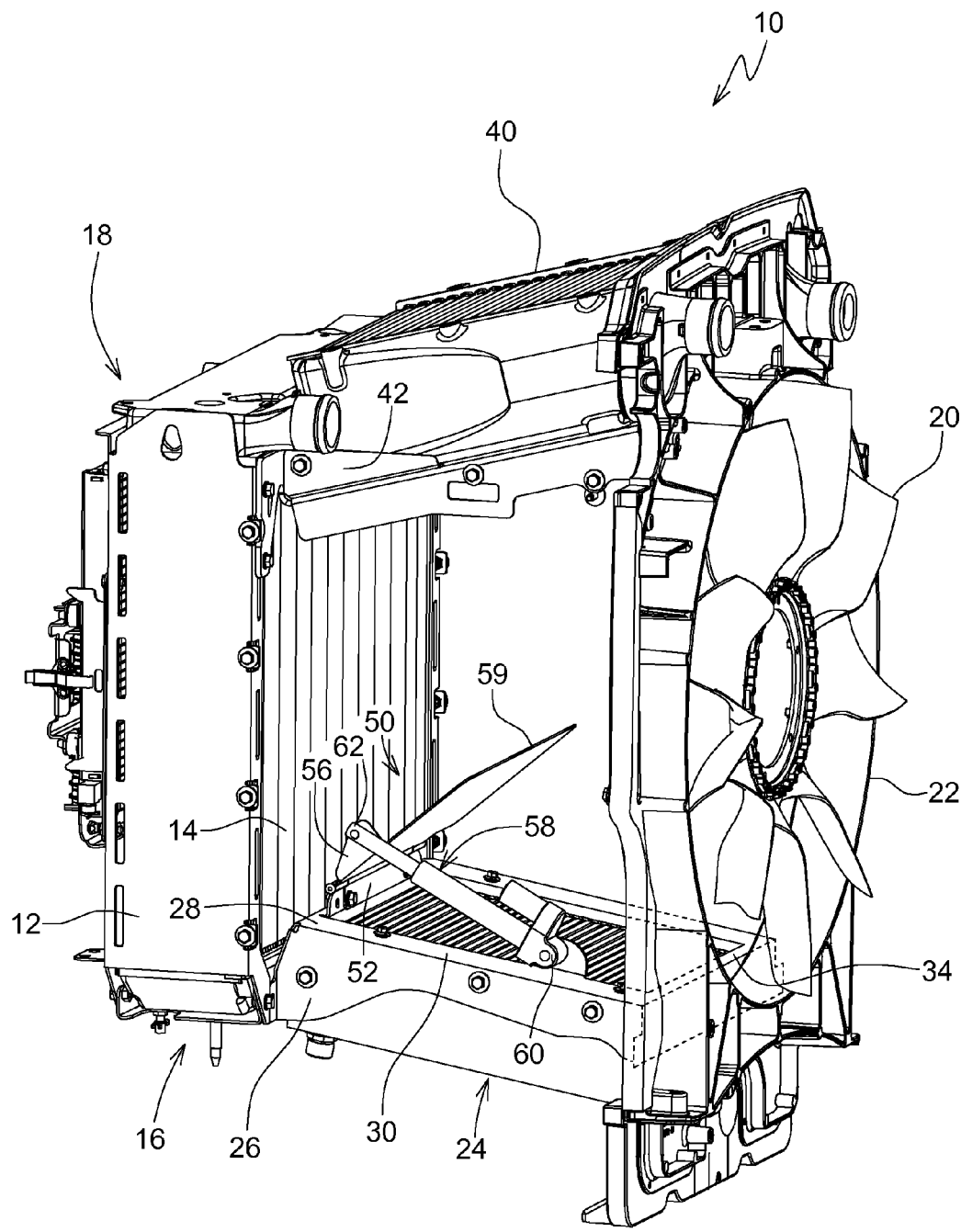
FIG. 1 is a perspective view of a cooling system with a pivotal baffle, embodying the invention.

Referring to FIG. 1, a cooling system 10 is provided for a work vehicle (not shown). The cooling system 10 includes a first frame 12 which supports a first or front heat exchanger 14, such as a vehicle radiator. Both the first frame 12 and the first heat exchanger 14 have a lower or first end 16 and an upper or second end 18 which are positioned opposite from each other.

A fan 20 is spaced apart from the first heat exchanger 14, and is surrounded by a fan frame 22. A second heat exchanger 24 extends between the fan 20 and the first end 16 of the first heat exchanger 14. The second heat exchanger 24 is supported by a second frame 26. Second frame 26 includes a front member 28, a left side member 30, a right side member 32 and a rear member 34.

A third or upper heat exchanger 40 is spaced apart from the second heat exchanger 24 and extends between the fan 20 and the second end 18 of the first heat exchanger 14. The third heat exchanger 40 is supported by a third frame 42 which extends between the upper end of the first frame 12 and an upper end of the fan frame 22.

A pivoting baffle assembly 50 includes a base plate 52 which is fixed to a central portion of front member 28 of second frame 26. A baffle plate 54 has an inner end pivotally coupled to an upper end of the base plate 52. An actuator arm 56 projects from the inner end of baffle plate 54 and is at an angle with respect to baffle plate 54. The baffle plate 54 has a pivot axis positioned adjacent to the first end 16 of the first heat exchanger 14. The baffle plate 54 extends into a space which is enclosed by the cooling system 10.

A linear actuator 58 has a first end or cylinder housing 60 pivotally coupled to the left side member 30 of second frame 26, and a second end or rod 62 pivotally coupled to the arm 56. The actuator 58 is preferable a hydraulic cylinder.

Figure 2:
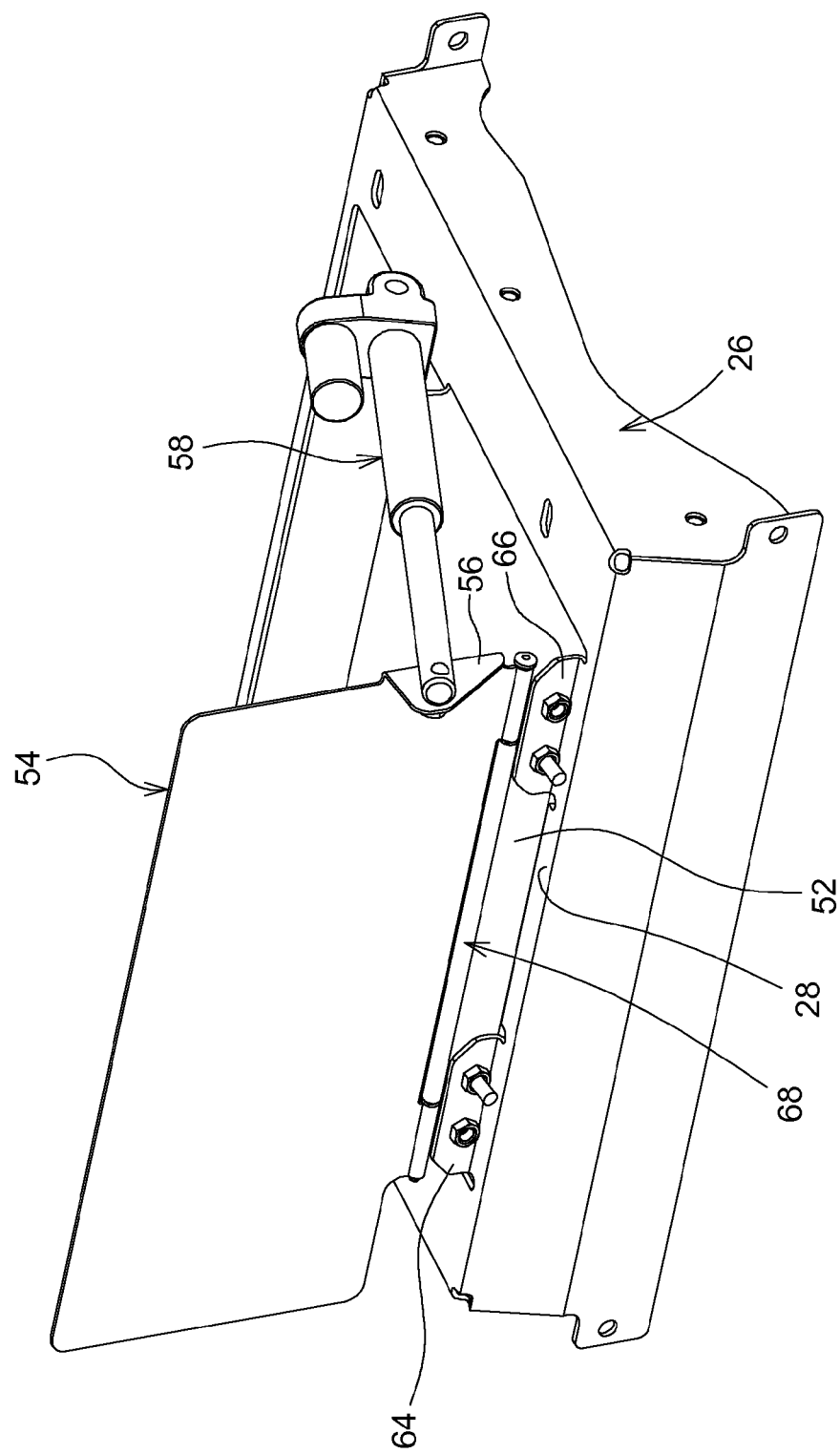
FIG. 2 is a perspective view of a detail of FIG. 1.
Figure 3:
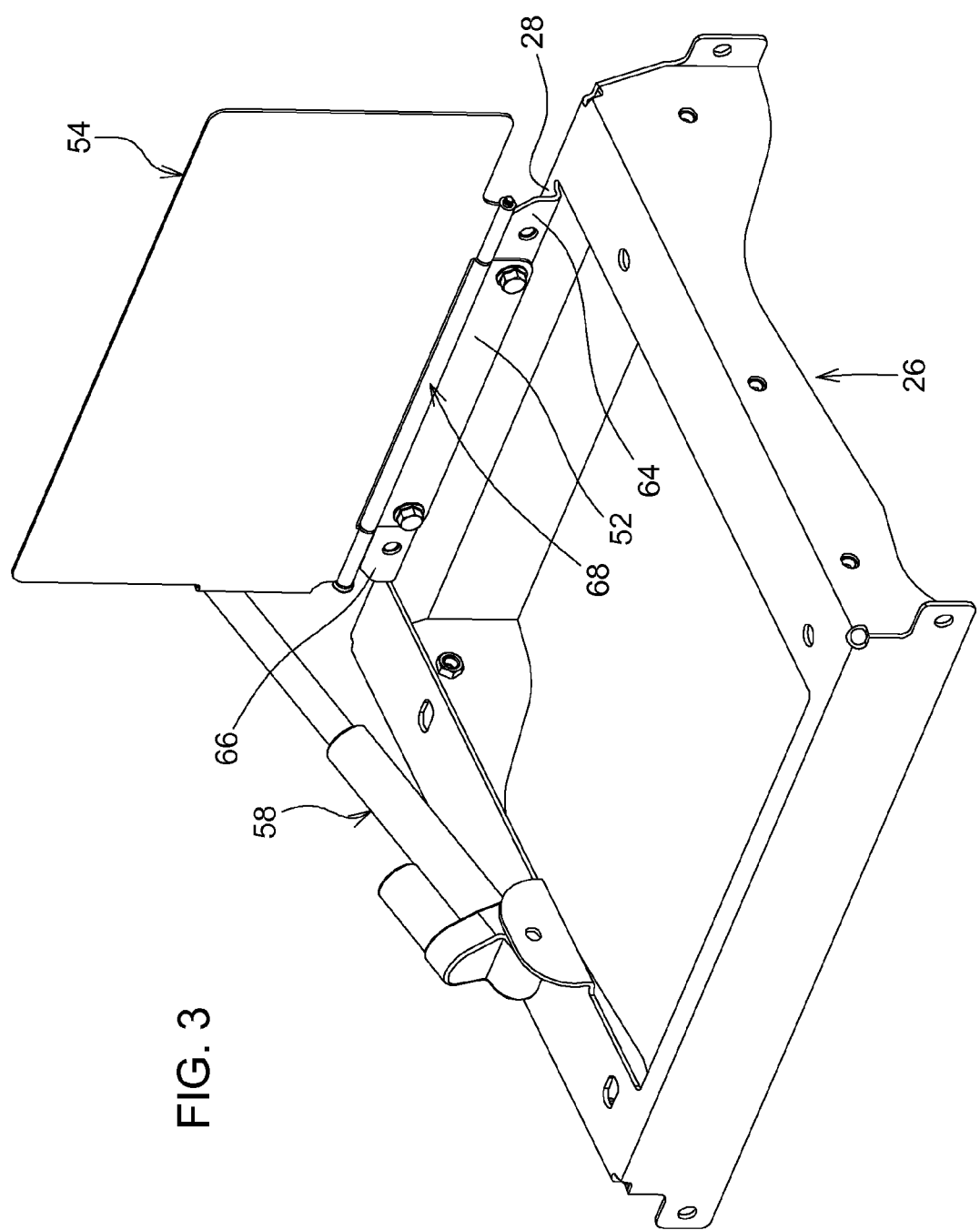
FIG. 3 is a different perspective view of the detail of FIG. 2.

Referring now to FIGS. 2 and 3, flanges 64 and 66 project upwardly from the upper portion of front member 28 of second frame 26. The base plate 52 is attached to the flanges 64 and 66. The base plate 52 is pivotally coupled to baffle plate 54 by a hinge 68. The actuator arm 56 projects rearwardly from one side of the baffle plate 54.

When the actuator 58 is fully extended, the baffle plate 54 will be adjacent to the heat exchanger 14 and will reduce the amount of air flow through the heat exchanger 14. When the actuator 58 is fully retracted, the baffle plate 54 will be adjacent to the heat exchanger 24 and will reduce the amount of air flow through the heat exchanger 24. The movable baffle can be electronically controlled using sensors (not shown) to determine which coolers need more airflow than others.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A cooling system for a work vehicle, comprising:
   a first heat exchanger having a first end and a second end positioned opposite from the first end;
   a fan spaced apart from the first heat exchanger;
   a second heat exchanger extending between the fan and the first end of the first heat exchanger;
   a third heat exchanger extending between the fan and the second end of the first heat exchanger, the fan and the first second and third heat exchangers enclosing a space having a generally quadrilateral cross-section where the fan is opposite the first heat exchanger, and the second heat exchanger is opposite the third heat exchanger;

a baffle plate pivotally mounted to the cooling system, the baffle plate having a pivot axis positioned adjacent to the first end of the first heat exchanger, the baffle plate extending into the space enclosed by the fan and the first, second and third heat exchangers;

an actuator for pivoting the baffle plate about the pivot axis;

wherein the fan pulls air into the space through the first, second and third heat exchangers creating a first air flow stream and a second air flow stream, and the baffle plate sits between the first and second air flow streams such that the first air flow stream comes into the space through the first heat exchanger then around the baffle plate and then out of the space through the fan and the second air flow stream comes into the space through the second heat exchanger then around the baffle plate and then out of the space through the fan;

wherein the second heat exchanger has a first end and a second end, and the third heat exchanger has a first end and a second end; the first ends of the second and third heat exchangers being located adjacent to the first heat exchanger and the second ends of the second and third heat exchangers being located adjacent to the fan; and wherein the distance between the first ends of the second and third heat exchangers is less than the distance between the second ends of the second and third heat exchangers.

2. The cooling system of claim 1, wherein:
the actuator comprises a linear actuator.

3. The cooling system of claim 2, wherein:
the actuator comprises a hydraulic cylinder having a cylinder housing pivotally coupled to one of the second and third heat exchangers, and having a rod pivotally coupled to the baffle plate.

4. The cooling system of claim 1, wherein:
the baffle plate is pivotal to a first position reducing air flow through the first heat exchanger and to a second position reducing air flow through the second heat exchanger.

5. The cooling system of claim 1, wherein:
an actuator arm projects from an inner end of the baffle plate, the actuator being coupled to the actuator arm.

6. The cooling system of claim 5, wherein:
the actuator arm projects at an angle with respect to the baffle plate.

7. The cooling system of claim 1, wherein the space enclosed by the fan and the first, second and third heat exchangers has a generally trapezoidal shape.

8. The cooling system of claim 7, wherein the fan is generally parallel to the first heat exchanger.

9. A cooling system for a work vehicle, comprising:
a first heat exchanger;
a fan spaced apart from the first heat exchanger;
a second heat exchanger extending between the fan and the first heat exchanger; a third heat exchanger spaced apart from the second heat exchanger and extending between the fan and the first heat exchanger, the fan and the first, second and third heat exchangers enclosing a space having a generally quadrilateral cross-section where the fan is opposite the first heat exchanger, and the second heat exchanger is opposite the third heat exchanger;

a baffle plate pivotally mounted to the cooling system, the baffle plate being pivotal to a first position reducing air flow through the first heat exchanger and to a second position reducing air flow through the second heat exchanger;

an actuator for pivoting the baffle plate;

wherein the fan pulls air into the space through the first, second and third heat exchangers creating a first air flow stream and a second air flow stream, and the baffle plate sits between the first and second air flow streams such that the first air flow stream comes into the space through the first heat exchanger then around the baffle plate and then out of the space through the fan and the second air flow stream comes into the space through the second heat exchanger then around the baffle plate and then out of the space through the fan;

wherein the second heat exchanger has a first end and a second end, and the third heat exchanger has a first end and a second end; the first ends of the second and third heat exchangers being located adjacent to the first heat exchanger and the second ends of the second and third heat exchangers being located adjacent to the fan; and wherein the distance between the first ends of the second and third heat exchangers is less than the distance between the second ends of the second and third heat exchangers.

10. The cooling system of claim 9, wherein:
the baffle plate has a pivot axis positioned adjacent to the first and second heat exchangers, the baffle plate extending into a space which is enclosed by the cooling system.

11. The cooling system of claim 9, wherein:
the actuator comprises a linear actuator.

12. The cooling system of claim 9, wherein:
the actuator comprises a hydraulic cylinder having a cylinder housing pivotally coupled to one of the second and third heat exchangers, and having a rod pivotally coupled to the baffle plate.

13. The cooling system of claim 9, wherein:
an actuator arm projects from an inner end of the baffle plate, the actuator being coupled to the actuator arm.

14. The cooling system of claim 13, wherein:
the actuator arm projects at an angle with respect to the baffle plate.

15. The cooling system of claim 9, wherein the space enclosed by the fan and the first, second and third heat exchangers has a generally trapezoidal shape.

16. The cooling system of claim 15, wherein the fan is generally parallel to the first heat exchanger.

* * * * *